M. C. FRENCH.
PLOW.
APPLICATION FILED FEB. 24, 1919.
1,333,969.
Patented Mar. 16, 1920.
3 SHEETS—SHEET 1.
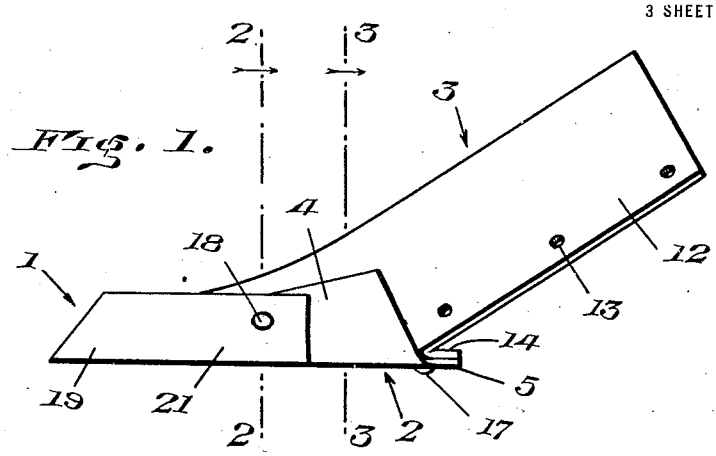
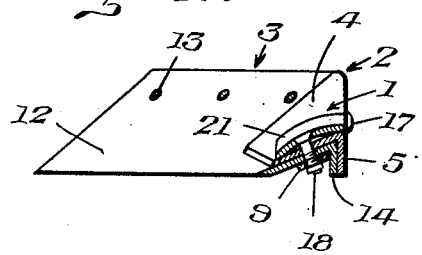
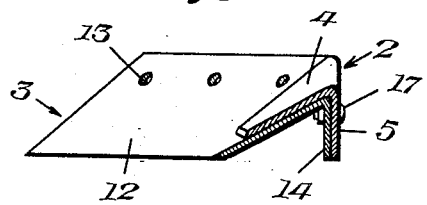
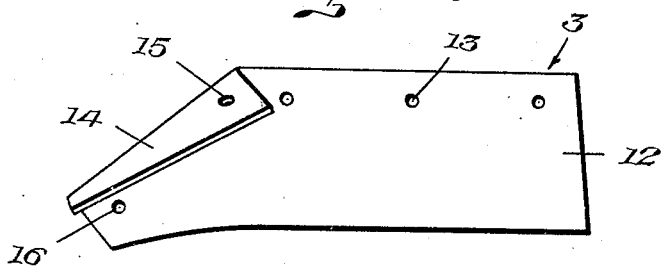
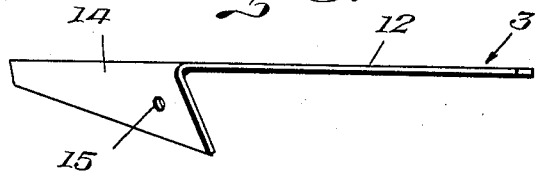
WITNESS:
Thos W Riley
INVENTOR.
Morgan C. French
BY
W. J. Fitz Gerald &Co
ATTORNEYS

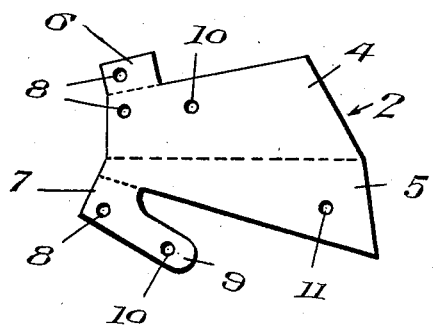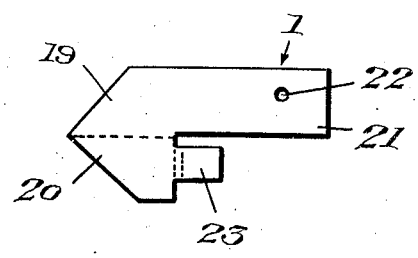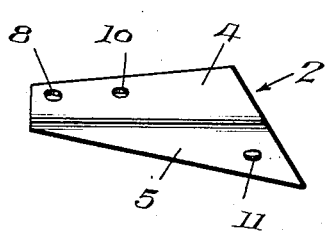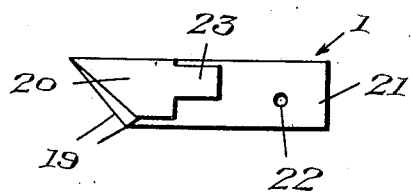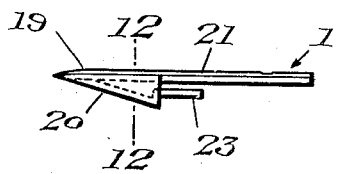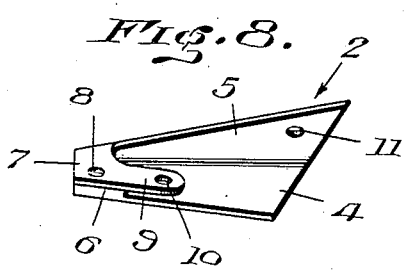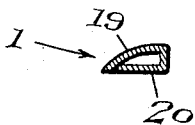

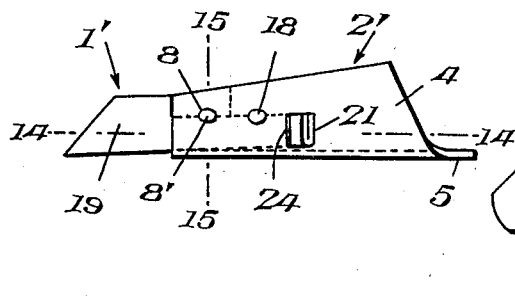
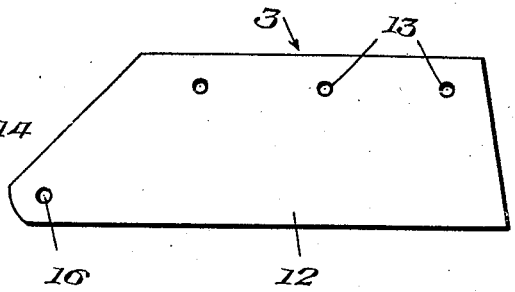
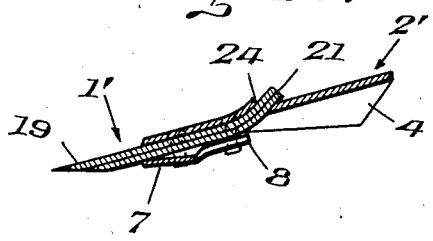
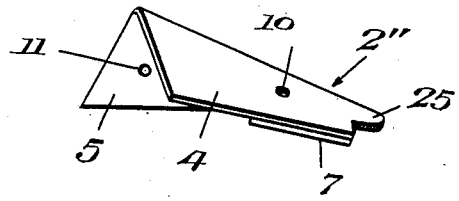
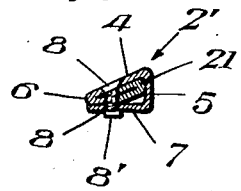
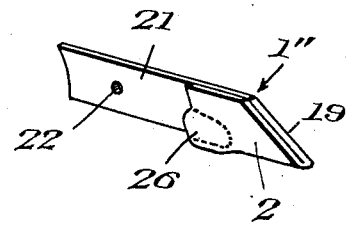
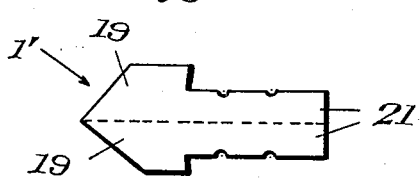
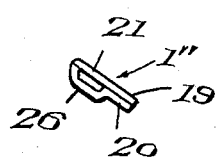

UNITED STATES PATENT OFFICE.

MORGAN C. FRENCH, OF CRAIG, COLORADO.

PLOW.

1,333,969.  Specification of Letters Patent.  Patented Mar. 16, 1920.

Application filed February 24, 1919. Serial No. 278,883.

*To all whom it may concern:*

Be it known that I, MORGAN C. FRENCH, a citizen of the United States, residing at Craig, in the county of Moffat and State of Colorado, have invented certain new and useful Improvements in Plows; and I do hereby declare the following to be a full, clear, and exact description of the invention, such as will enable others skilled in the art to which it appertains to make and use the same.

The present invention relates to plows, and more especially to slip shares, it being the primary object of the invention to provide a slip share of novel and improved construction and having such a combination or assemblage of its component elements as to enhance the utility and efficiency of the share, and enabling the improved feature to be used in old plows for purpose of repair, as well as in new plows when manufactured.

Another object of the invention is the provision of a shield and landside to fit over the forward end of the share, and constructed for the attachment of a removable slip point, the construction providing for the rigid attachment of the said parts together and also enabling them to be readily separated for purpose of repair or replacement.

A further object is the provision of a shield and landside which can be applied to various shares, in combination with a removable or slip point, said shield and point having novel interengageable means for attaching them together and to the share.

A still further object is the provision of such a construction, the parts of which can be readily and inexpensively manufactured from sheet metal or other suitable stock.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a plan view of the improved construction with the parts assembled.

Figs. 2 and 3 are cross sections taken on the respective lines 2—2 and 3—3 of Fig. 1.

Fig. 4 is a rear plan view of the share.

Fig. 5 is a rear edge view of said share.

Fig. 6 is a plan view of the shield and landside in blank form prior to being bent into shape.

Fig. 7 is a top view of the shield and landside in perspective.

Fig. 8 is a bottom perspective view of the shield and landside.

Fig. 9 is a plan view of the removable point in blank form prior to being bent into shape.

Fig. 10 is a bottom view of the point.

Fig. 11 is an edge view of said point.

Fig. 12 is a cross section taken on the line 12—12 of Fig. 11.

Fig. 13 is a plan view showing a modified form of shield and point.

Figs. 14 and 15 are sectional views taken on the respective lines 14—14 and 15—15 of Fig. 13.

Fig. 16 is a plan view of the slip point of Fig. 15 in blank form prior to being bent into shape.

Fig. 17 is a plan view of a modified form of share blade for purpose of repair.

Fig. 18 is a perspective view of another variation in the shield.

Fig. 19 is a perspective view of a removable point used with the shield shown in Fig. 18.

Fig. 20 is a rear end view of the point shown in Fig. 19.

The complete share, as shown in Fig. 1, comprises the removable or slip point 1, shield and landside 2, and share 3, the latter member being either manufactured to suit or being one already in use adapted for the shield, so that the present improvements can be used on prevailing styles of plows as well as new ones manufactured with the present improvements incorporated therein. The shield and landside 2 is designed to fit the forward end of the share 3 for rigid attachment thereto, and is intended to receive and hold the point 1, said shield and point being formed with means whereby they have a slip connection, permitting the point to be removed and replaced.

As shown more clearly in Figs. 6, 7 and 8, the shield and landside is stamped and bent from a sheet metal blank, although it can be manufactured in other ways, and it comprises a body of angular cross section, having the upper wing or flange 4 to overlap and bear on the forward portion of the share, and also having the depending landside flange 5 disposed in a longitudinal plane at the landside of the plow, while the wing or flange 4 is inclined transversely and extends downwardly at an angle from the flange 5, so that said flange will fit the forward portion of the share 3. The forward end of the shield 2 is formed with means for the reception and engagement of the point 1, and for this purpose, the opposite edges of the flanges 4 and 5 are provided at the forward end of the shield with ears 6 and 7 respectively, which are bent back downwardly underneath said flanges, the ear 6 being bent back against the lower surface of the wing 4 and terminating short of the corner or bend between the two flanges. The ear 7 is wider than the ear 6 and is bent back underneath and against the ear 6, and said ear 7 is provided with a rearwardly projecting tongue 9 provided with an aperture 10. The ears 6 and 7 and flange 4 are provided with registering apertures 8 through which a rivet, bolt or other securing member is inserted for clamping said parts together, and forming a socket opening at the forward end of the shield. In order that this socket can be understood, reference is had to Fig. 15, which shows the socket formed by the flanges 4 and 5 and the ears 6 and 7, although this is a modified form. The flange or landside portion 5 is provided near its rear end with an aperture 11 for attachment of the share 3, as will presently appear.

The share 3 comprises a blade or plate 12. This blade 12 is provided near its rear edge with apertures 13 for the attachment of the mold board, and is provided at its forward end with a vertical longitudinal depending flange or portion 14 against which the flange 5 fits, while the flange 4 overlaps and rests upon the forward portion of the blade 12. The shield is bent so as to fit snugly upon the portion of the blade, and as seen in Figs. 4 and 5, the forward end or tip of the share is cut off so as not to project beyond the forward end of the shield. Thus, in applying the shield to an old share for purpose of repair, the tip or point of the share blade is cut off, to accommodate the shield and removable point. If the improvements are used in a new plow, the blade 12 can be manufactured to suit the requirements. The flange or portion 14 has an aperture 15 to register with the aperture 11 of the shield, and it will be noted that said aperture can be drilled through flanges 5 and 14 when the shield and blade 12 are fitted together, so that a bolt 17 can be inserted for clamping said portions together. The blade 12 is also provided at its forward end with an aperture 16 to register with the aperture 10 in the wing 4 and tongue 9 of the shield, for the reception of a bolt 18 or other clamping member for clamping said parts together, it being noted that the forward end of the blade 12 projects forwardly under the flange 4 between said flange and tongue 9, as seen in Fig. 2. Thus, when the shield is applied to the share blade, it can be slipped rearwardly over the forward portion of the blade 12, so that the flange 4 slides over the blade while the tongue 9 will pass under the forward end of the blade, the flange 5 overlapping and sliding along the flange 14. The bolt 17 can then be inserted to clamp the flanges 5 and 14 together, and after the point 1 is applied, the bolt 18 can be inserted, thus clamping the point as well as the flange 5 of the shield on the blade 12 and making a rigid structure.

The point or tip 1 can also be made of sheet metal, as seen in Figs. 9, 10, 11 and 12. Thus, as shown, the point comprises upper and lower portions 19 and 20, respectively, which are bent on a longitudinal line so as to fit together, as seen in Fig. 12, the upper portion 19 being preferably slightly curved, and the bend between said portions being in the form of a roll, so as to give thickness to the point and make it very substantial in construction. The portion 19 is provided with a rearwardly extending shank 21 to overlap the flange 5 of the shield, while the portion 20 is adapted to abut the ear 7 of the shield, said portion 20 having an upwardly offset rearwardly projecting stub 23 to slip into the socket of the shield, that is, between the flange 4 and ear 7 and between the ear 6 and flange 5. This provides a slip joint between the shield and point, whereby the point in being slipped rearwardly over the shield with the shank 21 overlapping the flange 4, will introduce the stub 23 into the socket in the forward end of the shield. The shank 21 has an aperture 22 to register with the aperture 10 of the shield and aperture 16 of the blade 12, so that the bolt 18 when inserted clamps the shank 21 and wing 4 on the blade 12, thus holding all parts firmly together with the portion 20 of the point abutting the forward end of the shield and the portion or stub 23 fitting snugly within the socket of the shield. Naturally, the shield in fitting snugly over the forward portion of the blade 12, and the point being thus assembled with the shield, will rigidly hold the parts in place without danger of accidental displacement. By removing the bolt 18, the point 1 can be readily slipped from the shield for purpose of replacing or repairing the parts, and the bolt 17 will still hold the shield on the share blade. By removing the bolt 17, the shield can then be slipped from the share blade, permitting the shield to be easily applied to and removed from the share, as well as the point 1.

A modified form is shown in Figs. 13, 14, 15 and 16, wherein the shield and point are assembled in a slightly different manner.

The forward end of the shield 2' has the socket similar to that above described, formed by the ears 6 and 7 bent from the wings 4 and 5, but the point 1' is of slightly different form. It is readily bent from a blank, as shown in Fig. 16, which is doubled on a longitudinal lines, so as to provide the double portion 19 and doubled rearwardly extending shank 21. This shank 21 is designed to pass rearwardly through the socket in the forward end of the shield, so that the portion 19 abuts the forward end of the shield, and the wing is provided with an opening 24 through which the terminal of the shank 21 can pass upwardly, as seen in Fig. 14, so as to provide a rigid connection. The shank 21 is curved upwardly so as to pass through the opening 24, and the bolt 18 in being tightened will assist in holding the shank 21 in place.

Fig. 17 illustrates a blade used for repair purposes. This blade can be applied to the shield and suitable holes drilled to attach said parts together, instead of using the share blade as shown in Fig. 1.

Figs. 18, 19 and 20 illustrate a further variation in the connection between the shield 2'' and point 1''. This point 1'' has the upper and lower portions 19 and 20 bent together, the portion 19 having a rearwardly extending shank 21 like that shown in Fig. 1, but in this form, the socket is in the point instead of in the shield. Thus, the forward end of the flange 4 has a lug 25 projecting therefrom, and the portion 20 of the point is bulged or offset downwardly at its rear end, to provide a socket 26 to receive the lug 25 when the point is moved rearwardly into place against the forward end of the shield with the shank 21 overlapping the wing 4 and the portion 20 abutting the ear 7. Thus, when the shank 21 is clamped on the flange 4, the lug 25 in fitting snugly within the socket 26 will prevent transverse displacement of the point.

Having thus described the invention, what is claimed as new is:—

1. A plow share embodying a shield to fit over the forward end of a share blade, and a point to fit the forward end of the shield, said shield and point having means for attaching them together.

2. A plow share embodying a shield to fit over the forward portion of a share blade, and a removable point to fit the forward end of the shield, said shield and point having a slip connection.

3. A plow share embodying a shield to fit over the forward portion of a share blade, and a removable point to abut against the forward end of the shield, said shield and point having a slip connection including a socket in one of said parts and a portion on the other part to enter the socket when said parts are moved together.

4. A plow share embodying a shield to fit over the forward end of the share blade, and a removable point to fit the forward end of the shield and having a rearwardly extending shank to fit the shield.

5. A plow share including a shield of angular cross section having flanges to fit over the forward portion of a share blade, and a removable point to fit the forward end of said flanges, said point and flanges having means for clamping the shield and point together.

6. A plow comprising a shield, a removable point at the forward end of the shield having a slip connection therewith, a share blade, said shield and blade having portions overlapping, and means for securing said blade and point to the shield.

7. A plow share including a shield of angular cross section having wings to fit over the forward portion of a share blade, and a removable point to fit the forward end of said wings, the forward end of said wings and point having a slip connection including a socket in one of said parts and a portion on the other part to enter the socket when the shield and point are slid together.

8. A plow share including a shield of angular cross section having flanges, and a removable point to abut the forward end of one flange and having a rearwardly extending shank to fit and be secured to one flange of the shield.

9. A plow share including a shield of angular cross section having flanges to fit over the forward portion of a share blade, and a removable point to abut the forward end of the shield, the forward end of said flanges having means for the engagement of a part of the point to provide a slip connection therebetween.

10. A plow comprising a shield of angular cross section having a land side flange and another flange, a removable point having a slip connection with the forward end of the shield, a share blade, a second named flange overlapping said blade, and means extending through the second named flange for securing said blade and point thereto.

11. A plow share including a shield of angular cross section having a landside flange and another flange to overlap the share blade for attachment thereto, said shield having portions at its forward end bent back underneath the second flange and a removable point to abut the forward end of the shield and said portions, and having a rearwardly extending shank to fit the second named flange and be secured thereto.

12. A plow share shield of angular cross section having a landside flange and another flange to overlap and be secured to a share blade, said flanges being provided at their forward ends with means for the reception of a removable point.

13. A plow share shield of angular cross section having a landside flange and another flange to overlap and be secured to a share blade, said shield being provided at its forward end with means bent back under the second named flange for accommodating a removable point.

14. A plow share point embodying upper and lower portions doubled together on a longitudinal line, the upper portion having a rearwardly extending shank.

In testimony whereof I have signed my name to this specification.

MORGAN C. FRENCH.